United States Patent [19]

Munroe et al.

[11] Patent Number: 5,471,743
[45] Date of Patent: Dec. 5, 1995

[54] METHOD OF DISASSEMBLING A GAS TURBINE ENGINE POWER PLANT

[75] Inventors: Alan D. Munroe, Glastonbury; Karl D. Blume, Rocky Hill, both of Conn.; Robert E. Gurney, Hampden, Mass.

[73] Assignee: United Technologies Corporation, Hartford, Conn.

[21] Appl. No.: 394,932

[22] Filed: Feb. 27, 1995

Related U.S. Application Data

[60] Continuation of Ser. No. 17,559, Feb. 16, 1993, abandoned, which is a division of Ser. No. 817,195, Jan. 6, 1992, Pat. No. 5,224,341.

[51] Int. Cl.$^6$ .................................................. B23P 15/00
[52] U.S. Cl. .................................. 29/889.3; 29/889
[58] Field of Search ........................... 29/889.3, 889, 29/428; 60/226.1, 39.31; 415/189, 201

[56] References Cited

U.S. PATENT DOCUMENTS

| | | |
|---|---|---|
| 2,843,357 | 7/1958 | Spindler, Jr. . |
| 3,398,535 | 8/1968 | Campbell et al. . |
| 3,494,539 | 2/1970 | Littleford .......................... 60/226.1 |
| 3,842,595 | 10/1974 | Smith et al. ........................ 60/39.36 |
| 4,011,718 | 3/1977 | Asplund ............................. 60/39.31 |
| 4,132,069 | 1/1979 | Adamson et al. .................. 60/226 R |
| 4,571,936 | 2/1986 | Nash et al. ........................ 60/39.31 |
| 4,744,214 | 5/1988 | Monsarrat et al. ................. 60/226.1 |
| 4,934,140 | 6/1990 | Dennison et al. .................. 60/226.1 |

FOREIGN PATENT DOCUMENTS 1539222  8/1968  France .

*Primary Examiner*—Irene Cuda

[57] ABSTRACT

A method and apparatus which facilitate separation of a gas turbofan powerplant into modules for shipping, maintenance and repair is disclosed. Various construction details are developed which provide means for mounting a fan cowling to an engine core in a manner which permits transference of operational loads from the fan cowling to the engine core and separation of the fan cowling from the engine core. In one embodiment, a fan cowling (46) is attached to an engine core (18) by a plurality of radially extending through struts (64). The through struts include a bolted joint (72) which permits separation of a powerplant (12) into a first module and a second module. For this embodiment, a method for varying between an assembled and disassembled condition is comprised of manipulating the joints between an engaged and disengaged position and axially moving the separate modules along a longitudinal centerline (14).

5 Claims, 5 Drawing Sheets

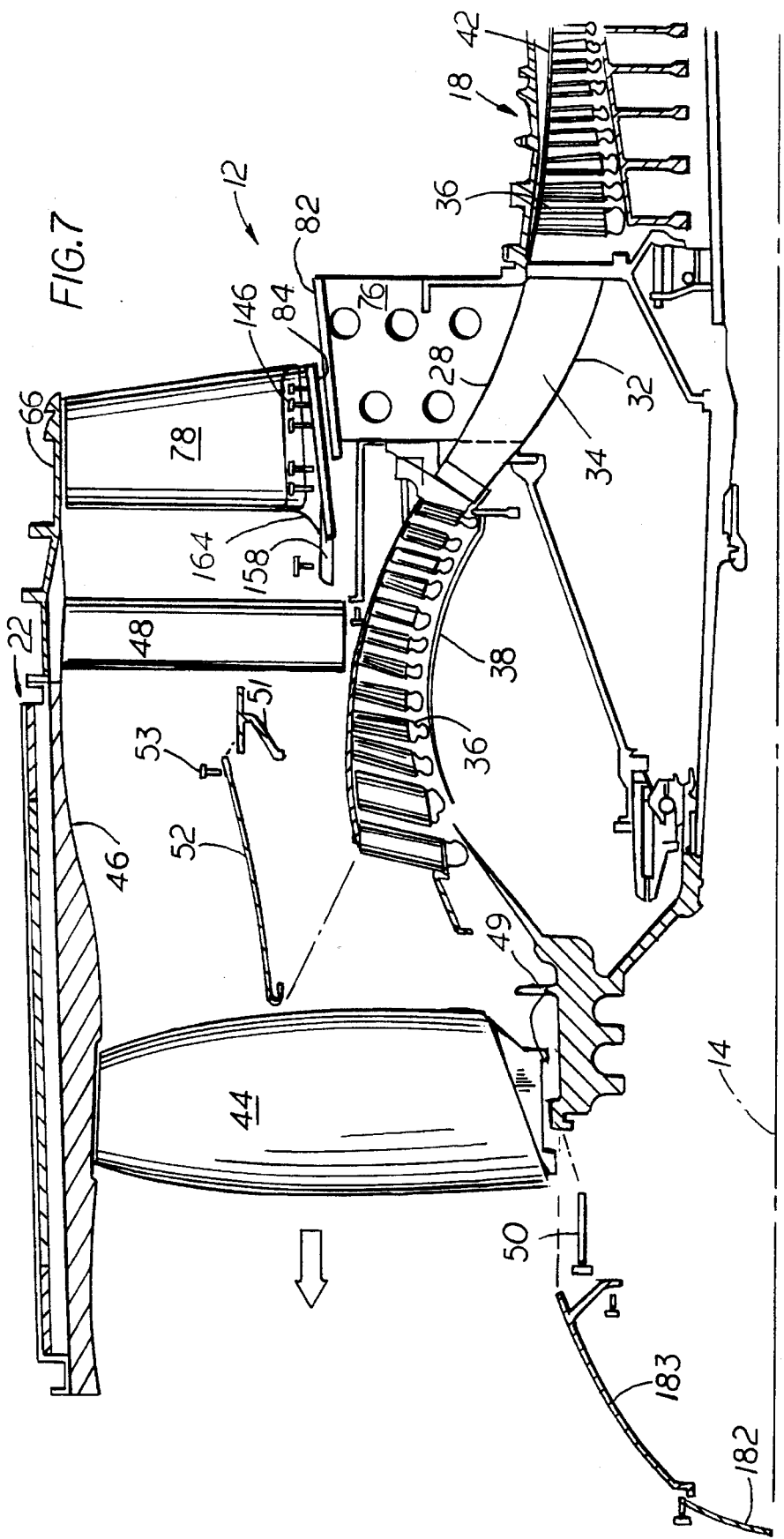

METHOD OF DISASSEMBLING A GAS TURBINE ENGINE POWER PLANT

This is a File Wrapper Continuation application of U.S. Ser. No. 07/017,559, filed Feb. 16, 1993, abandoned, which is a divisional of U.S. Ser. No. 07/817,195, filed Jan. 6, 1992, now U.S. Pat. No. 5,224,341.

TECHNICAL FIELD

This invention relates to gas turbofan engines, and, more particularly, to an apparatus and method to separate a gas turbofan engine into modules.

BACKGROUND ART

An aircraft includes an airframe having a powerplant which provides thrust for the aircraft. For large aircraft a common type of powerplant is a gas turbofan engine. The gas turbofan engine includes an engine core and a fan section. The engine core is disposed on the airframe and has a primary flowpath. The fan section is disposed coaxial with and radially outward of the engine core and has a secondary flowpath. A fan cowling envelops the fan section and outwardly bounds the secondary flowpath.

Modern aircraft, and the gas turbofan engines used to power them, are being required to produce increasing amounts of thrust. A consequence of this increased thrust production is an increase in the radial and axial dimensions of the turbofan engine. The radial dimension is generally determined by the fan section and the axial dimension is generally determined by the engine core. The size of the modern turbofan engines has made it more difficult, if not impossible, to ship the engine as a single unit. In addition, the size of the engine makes maintenance and repair work more complex and difficult.

An area of concern with the large gas turbofan engines is the structural mounting of the fan cowling to the engine core. The mounting structure is required to transfer all the operational loads on the fan cowling, such as structural, thrust and aerodynamic loads, to the engine core and thence to the airframe. At the same time, the mounting structure is required to maintain the concentric alignment of the fan cowling and engine core.

One such mounting structure is disclosed in U.S. Pat. No. 3,398,535, entitled "Engine Supporting Structure", issued to Campbell. Campbell discloses mounting structure having a plurality of struts interconnecting an inner ring mounted on the engine core, a mid-span ring, and an outer ring mounted on the fan cowling. The mid-span ring provides increased structural rigidity to the mounting structure. In addition, a plurality of V-struts connect the mid-span ring with points axially downstream on the engine wall in order to transmit axial loads to the engine wall. One drawback to this type of mounting structure is the low efficiency of the load path provided by the multiple rings and V-struts. Another drawback is that the outer casing of the engine core must be stiffened in order to transfer the operational loads to the engine core.

A simple and low cost alternative to the Campbell type mounting structure is a mounting structure having an intermediate case with a plurality of through struts. The through struts are the predominant means to transfer operational loads from the fan cowling to the engine core. Each through strut extends radially from an inner flow surface of the primary flowpath to an outer ring attached to the fan cowling. The through struts provide a simple and efficient load path for the transfer of the operational loads from the fan cowling to the engine core.

A drawback to the through strut concept is the difficulty of separating a powerplant of this type into separate modules for shipping. One solution to this problem was disclosed in U.S. Pat. No. 4,744,214, issued to Monsarrat et al and assigned to Applicants' Assignee, entitled "Engine Modularity". Monsarrat et al discloses structure which permits the turbofan engine to be split into a front portion comprised of the fan cowling, a low pressure compressor, and the intermediate case, and an aft portion comprised of a high pressure compressor and a turbine section. The split occurs by separating a stub shaft from a low pressure rotor shaft, which drives the fan and low pressure compressor, and unbolting the intermediate case from the high pressure compressor.

The above art notwithstanding, scientist and engineers under the direction of Applicants' Assignee are working to develop structure and methods to easily separate gas turbofan type engines into modules for shipping, repair and maintenance.

DISCLOSURE OF INVENTION

An object of the present invention is a gas turbofan powerplant having a fan cowling joined to an engine core by means of a through strut, and which separates into modules for shipping, repair and maintenance.

Another object of the present invention is a through strut which separates to facilitate division of a gas turbofan powerplant into modules.

According to the present invention, an improved gas turbofan engine includes a first module, a second module, and a plurality of through struts connecting the modules, each of the struts having an easily disengageable joint which facilitates separation of the modules through diverging relative motion of the two modules along a common longitudinal axis. The first module is comprised of an engine core and an inner portion of the strut. The second module is comprised of a fan cowling and an outer portion of the strut.

According to a specific embodiment of the present invention, each joint includes a complementary pair of mating fixtures having planar mating surfaces which are canted relative to the axis and which, in a disassembled condition, have a radial separation between the mating surfaces. The plurality of canted mating surfaces approximate a pair of complementary conical surfaces. The radial separation between mating surfaces provides a tensile preload to the through struts in an assembled condition.

According further to the present invention, a method of alternating a gas turbofan powerplant between an assembled condition and a disassembled condition is comprised of the following steps: manipulating the joints between an engaged and disengaged position, and axially moving a first module relative to a second module along a longitudinal centerline.

A principal feature of the present invention is the load bearing, easily disengageable joint between the inner portion and outer portion of the strut. Another feature is the cant of the mating surfaces which, taken as a plurality, approximates a pair of complementary conical mating surfaces. A further feature is the radial separation between the mating surfaces when the joint is in a disassembled condition.

Advantages which result from the use of the bolted joint of the invention is the simplicity of the mounting structure and the ease of assembly/disassembly of the turbofan engine. The through strut provides both structural strength to transfer loads between the fan cowling and engine core and also provides modularity of the turbofan engine. Assembly and disassembly of the gas turbofan powerplant is made easier as a result of the conical mating surfaces because of the clearance between the mating surfaces as the two modules are separated. The assembly and disassembly of the turbofan modules is also made easier because of the clearance provided by the radial separation between the unassembled mating surfaces. In addition, the radial separation introduces a tensile preload into the struts in an assembled condition to enhance the load bearing characteristics of the mounting structure.

The foregoing and other objects, features and advantages of the present invention become more apparent in light of the following detailed description of the exemplary embodiments thereof, as illustrated in the accompanying drawings.

BRIEF DESCRIPTION OF DRAWINGS

FIG. 5 is a side view of a strut joint in an unassembled condition and engaged with a pulling tool.

FIG. 6 is a side view of a strut joint in an assembled condition, partially cut away to show a threaded aperture for a jacking bolt.

BEST MODE FOR CARRYING OUT THE INVENTION

Figure 1:
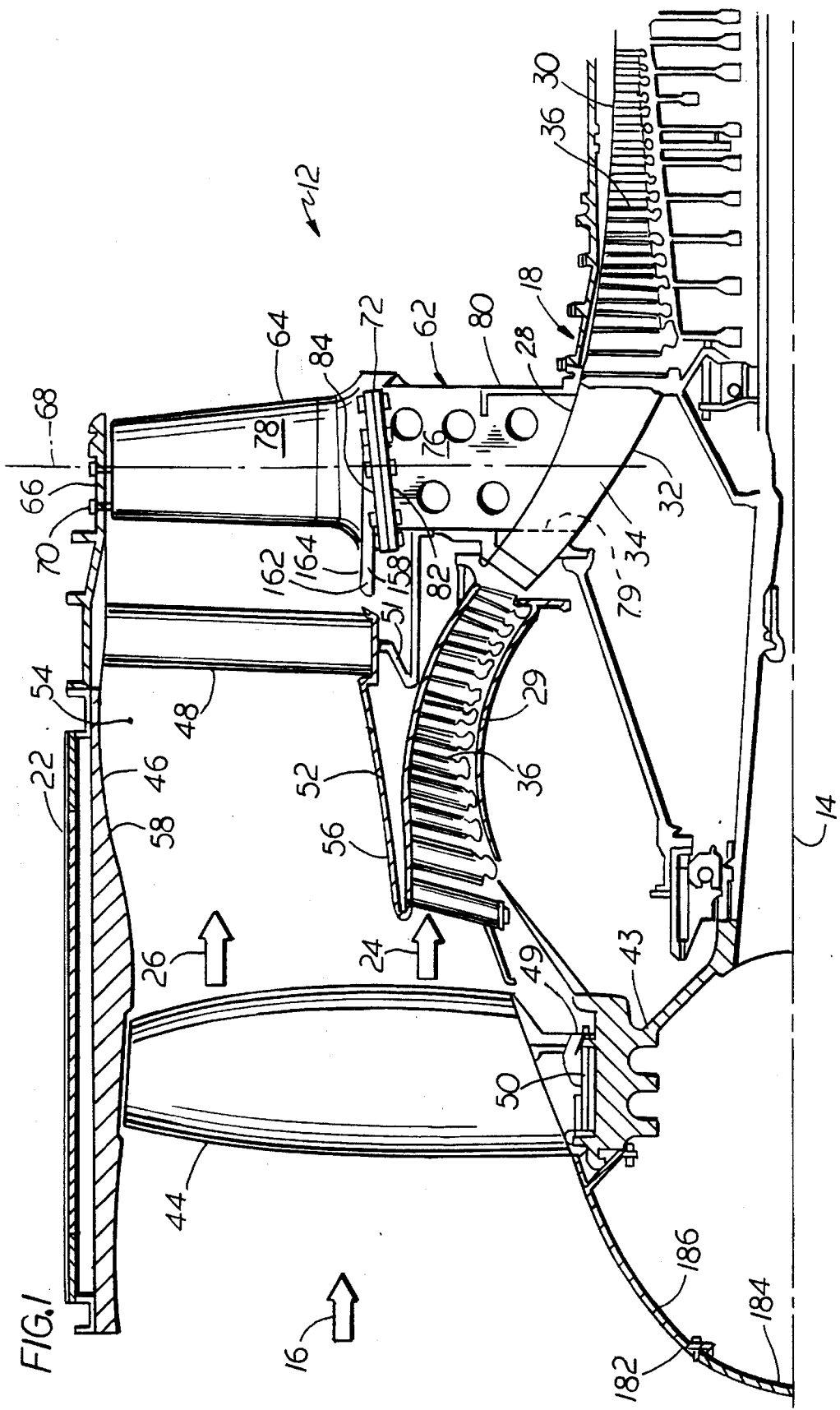
FIG. 1 is a sectional view of a gas turbofan powerplant.

A gas turbofan powerplant 12 in accordance with the present invention is illustrated in FIG. 1. The turbofan powerplant 12 extends about a longitudinally extending centerline 14 and has an axially oriented flowpath 16 for a working fluid. The turbofan powerplant 12 includes an engine core 18 and a fan assembly 22. The flowpath 16 includes a primary flowpath 24 extending through the engine core 18 and a secondary flowpath 26 extending through the fan assembly 22. The ratio of the amount of working fluid flowing through the secondary flowpath 26 relative to the amount of working fluid flowing through the primary flowpath 24 defines a bypass ratio.

The engine core 18 is circumferentially disposed about the centerline 14. The engine core includes an outer case 28, a low pressure compressor 29, and a high pressure compressor 30. An inner platform 32 is spaced radially from the outer case 28 leaving the primary flowpath 24 therebetween.

The fan assembly 22 includes a fan disk 43 and a plurality of fan blades 44 which extend outwardly across the flowpath 16. The fan blades 44 are retained to the disk 43 by engagement of the blades 44 with a retaining groove 49 and a blade pin 50. A fan cowling 46 extends circumferentially about the blades and a plurality of fan exit case guide vanes 48. The fan exit case guide vanes 48 are attached to the fan cowling 46 and to a support cone 51 which is disposed between the engine core 18 and plurality of guide vanes 48. A flow splitter 52 provides a partition between the fan assembly 22 and the low pressure compressor 29. The flow splitter 52 is mounted on the engine core 18 by a plurality of radial bolts 53. The radial separation between the flow splitter 52 and the fan cowling 46 defines a portion of the secondary flow passage 26. The flow splitter 52 provides a radially inner flow surface 56 and the fan cowling 46 provides a radially outer flow surface 58.

An intermediate case 62 is axially located between the low pressure compressor 29 and the high pressure compressor 30 of the engine core 18. The intermediate case 62 structurally connects the fan cowling 46 to the engine core 18. The intermediate case 62 includes a plurality of struts 64 and an outer ring 66. The struts 64 extend from the inner platform 32 of the engine core 18 to the outer ring 66. Each of the struts 64 is hollow to reduce weight and circumferentially continuous about a spanwise axis 68 of the strut 64. The outer ring 66 connects the intermediate case 62 with the fan cowling 46 through a bolted connection 70.

Figure 2:
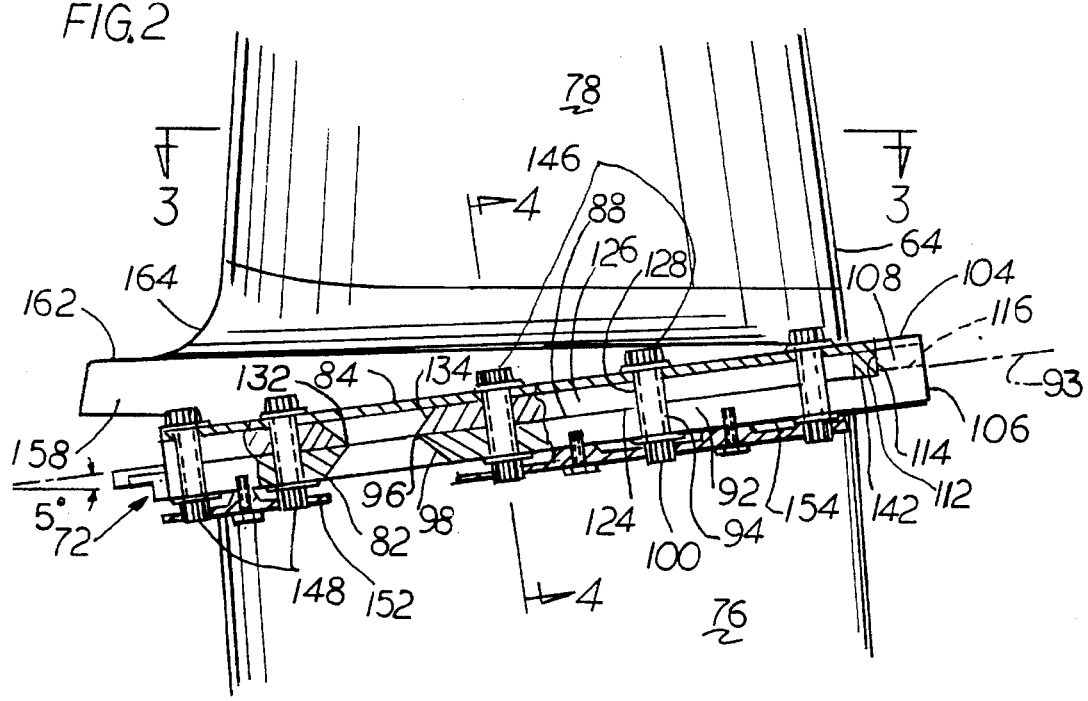
FIG. 2 is a side view of a bolted strut joint.
Figure 3:
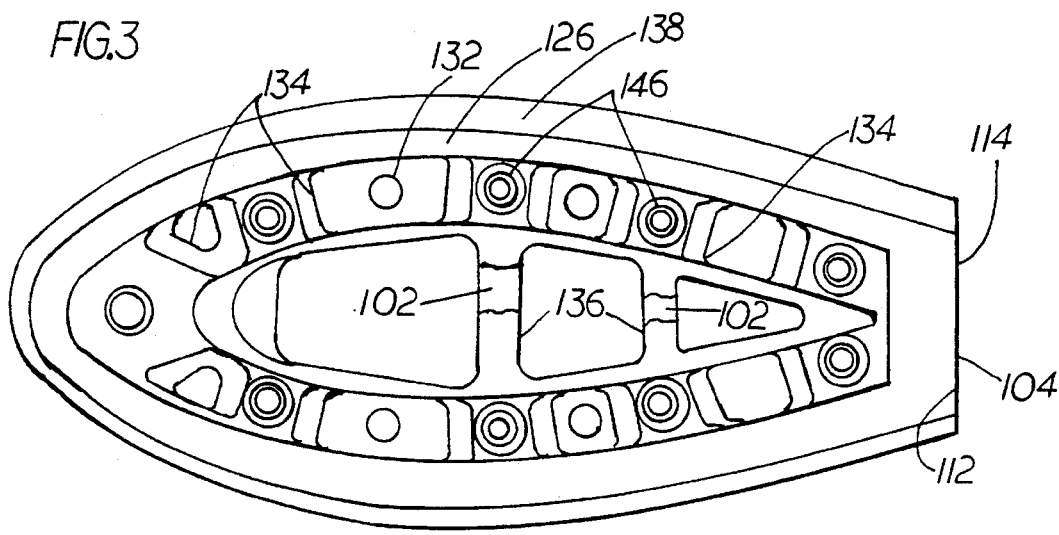
FIG. 3 is a partially cut away view of a strut joint taken along line 3—3 of FIG. 2.
Figure 4:
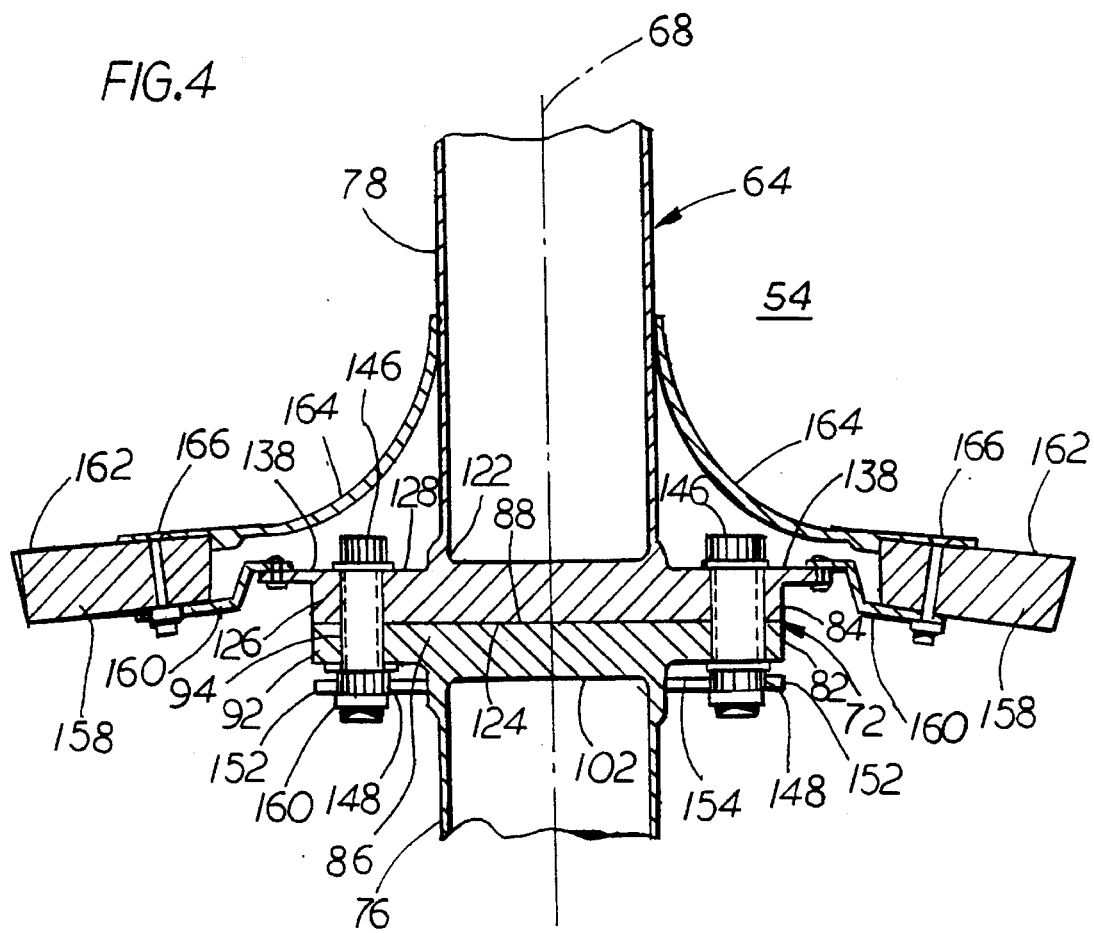
FIG. 4 is a view of a strut joint taken along line 4—4 of FIG. 2.

Referring now to FIGS. 2, 3 and 4, each of the struts 64 has a joint 72 radially located near the inner flow surface 56 of the fan assembly 22. The joint 72 separates the strut 64 into an inner portion 76 and an outer portion 78. The inner portion 76 extends radially from the inner platform 32 to the joint 72. The inner portion 76 is comprised of a core portion 79 (see FIG. 1), disposed within the primary flow passage 34 and having an aerodynamic cross-section, and an intermediate portion 80, disposed between the outer case 28 and the joint 72. The outer portion 78 extends radially from the joint 72 to the outer ring 66 and has an aerodynamic cross-section. The joint 72 is comprised of a first mating fixture 82 disposed on the inner portion 76 and a second mating fixture 84 disposed on the outer portion 78. The two mating fixtures 82, 84 are complementary.

The first mating fixture 82 is located on the radially outward end 86 of the inner portion 76. The first mating surface 82 includes a first mating surface 88 and a joint flange 92 disposed around the perimeter of the outward end 86. The first mating surface 88 defines a plane which is canted relative to the centerline 14 such that the plurality of mating surfaces approximate a radially outwardly facing conical surface. The angle formed between the planar first mating surface 88 and the centerline 14 is five (5) degrees. A canted mating surface is advantageous during assembly to make alignment of the fixtures 82, 84 easier. In addition, during disassembly a canted mating surface will provide immediate clearance between the mating surfaces. Although an angled surface of five (5) degrees is shown for illustrative purposes, any positive angle will produce benefits, with more severely canted surfaces, limited by the space available, producing greater benefits. While, a joint having no cant is possible, the likelihood of interferences between mating surfaces during assembly and disassembly is increased due to the lack of radial clearance.

The joint flange 92 has a plurality of bolt holes 94, alignment holes 96, and cut-outs 98. The bolt holes 94 are symmetrically spaced about and parallel to the spanwise axis 68 of the strut 64. The cut-outs 98 correspond to portions of the joint flange 92 which are not loaded by a fastening means 100 engaged through the bolt holes 94. Removing the non-loaded portions of the flange 92 reduces the weight of the joint 72 without reducing the strength and load path efficiency.

A plurality of transverse ribs 102 pass through the hollow portion of the strut 64 to interconnect symmetric bolt holes 94. By interconnecting bolt holes 94 in this manner, the strength and rigidity of the joint 72 is increased. In effect, each rib 102 and the corresponding bolt hole 94 portions of the joint flange 92 act as bolted beams which extend from one side of the joint 72 to the other. The use of bolt holes 94 interconnected by ribs 102 and a joint flange 92 with cut-outs 98 produces the structural benefits of having a bolted plate type joint without the additional weight of structurally unnecessary portions of the plate.

The first mating fixture 82 also has an axial stop 104 located on the downstream end 106 of the joint flange 92. The axial stop 104 consists of a radially outwardly extending lip 108 having an upstream facing surface 112 which mates with a downstream edge 114 of the second mating fixture 84. The lip 108 includes a threaded aperture 116 which extends through the lip 108 and is adapted to engage a jacking bolt 118 (see FIG. 6).

The second mating fixture 84 is located on the radially inward end 122 of the outer portion 78 and includes a second mating surface 124 and a joint flange 126 which compliment the first mating surface 88 and the joint flange 92, respectively, of the first mating fixture 82. The joint flange 126 of the second mating fixture 84 includes bolt holes 128, alignment holes 132, and cut-outs 134 which, in an assembled condition, align with the bolt holes 94, alignment holes 96, and cut-outs 98 respectively of the first mating fixture flange 82. As with the first mating fixture 82, the second mating fixture 84 includes a plurality of transverse ribs 136 which extend between symmetric bolt holes 128. The second mating fixture 84 also includes a secondary flange 138 which extends about the perimeter of the joint flange 126 and which includes a pair of radially inward projections 142. The projections 142 are configured to engage with a pulling tool 144 (see FIG. 5).

In a disassembled condition, a radial gap 145 exists between the two mating surfaces 88, 124 (see FIG. 5). The first mating surface 88 has a radial distance, defined by the radial distance between the first mating surface 88 and the centerline 14, which is less than the radial distance of the second mating surface 124, defined similarly. This difference produces the radial separation or gap 145 between the mating surfaces 88, 124. The radial gap 145 helps prevent interference due to misalignment of the mating fixtures 82, 84 during assembly of the powerplant 12. In an assembled condition, as shown in FIG. 1, the radial gap 145 is eliminated by the fastener means 100 which produces sufficient force to overcome the spring force of the outer ring 66. Elimination of the radial gap 145 introduces a tensile preload into the struts in an assembled condition. The tensile preload enhances the load bearing characteristics of the mounting structure.

The fastener means 100 provides means to removably fasten the mating fixtures, 82, 84. The fastener means is comprised of a plurality of threaded bolts 146 which are disposed within the bolt holes 94, 128. The threaded bolts 146 extend through both bolt holes 94, 128 and are engaged with a corresponding plurality of threaded nuts 148. The threaded nuts 148 are contained within a plurality of nut plates 152 which capture the threaded nuts 148 to provide a reaction force to the torque generated by the bolt 146 during assembly. The nut plates 152 are attached to the radially inward face 154 of the first mating fixture 82 through bolted engagement 156 with the first mating fixture 82.

Referring now to FIG. 4, a plurality of sound panels 158 are circumferentially disposed between adjacent struts 64. Each of the sound panels 158 is a conical section mounted to adjacent struts 64 through bolted engagement with a bracket 160 attached to the secondary flange 138. The plurality of sound panels 158 form a radially inward flow surface 162 for a portion of the secondary flow passage 54. The flow surface 162 of the sound panels 158 is immediately downstream of the flow surface 56 of the flow splitter 52. The sound panels 158 are configured to reduce the acoustic energy emanating from the engine core 18. In addition, the sound panels 158 are rigid plates which provide rigidity to the outer portions 78 in the disassembled condition. Rigidity of the outer portions 28 facilitates alignment of the mating surfaces 82, 124 during assembly.

A molded fillet 164 is disposed about the inward end 122 of each outer portion 78. The molded fillet 164 provides a aerodynamically smooth transition between the outer portion 78 and the sound panels 158. Each of the molded fillets 164 is connected to the sound panels 158 by means of a bolted connection 166.

Assembly of the gas turbofan powerplant 12 is comprised of the following steps. First, the fan cowling 46, outer ring 66, and outer portion 78 are moved into position by axially convergent motion along the centerline 14 such that the first and second mating fixtures 82, 84 are in proximity. The fan cowling 46 is moved axially until the second mating fixture 84 abuts the axial stop 104. In the event that a joint 72 is not easily engaged, the pulling tool 144 may be used as shown in FIG. 5. The pulling tool 144 has appendages 168 which engage the projections 142 on the second mating fixture 84 and a threaded rod 172 with a face 174 which engages the downstream end 106 of the axial stop 104. The threaded rod 72 is engaged with a threaded aperture 176 in the pulling tool 144. As the threaded rod 172 is inserted into the threaded aperture 176, the face 174 exerts a force on the axial stop 104 to push the first mating fixture 82 upstream and the appendages 168 engage the projections 142 to pull the second mating fixture 84 downstream.

A third step may be necessary to align the bolt holes 94, 128. The step involves inserting a prying bar (not shown) into the alignment holes 96, 132 of the two mating fixtures 82, 84 and moving one fixture relative to the other fixture in a conventional manner. Interaction between the prying bar and the alignment holes 96, 132 can be used to align the bolt holes 94, 128 in order to insert the bolts 146. Once the bolt holes 94, 128 are aligned, the fourth step is to insert the bolts 146 into the bolt holes 94, 128 and engage them with the nuts 148 which are constrained within the nut plates 152. In the event that the alignment described above is insufficient to align the bolts 146 with the nuts 148, the nut plates 152 may be loosened by loosening the bolted connection 156 from the first mating fixture 82. In this way the nuts 148 are allowed some freedom of motion in order to align them with the bolts 146. Once all the bolts 146 are engaged with the nuts 148, the nut plates 152 are then secured to the first mating fixture 82.

Once all the joints 72 are engaged for the fan struts 64, the remaining steps consist of positioning and attaching to the turbofan powerplant 12 the remaining items. First, the molded fillets 164 are positioned around the struts 64 and bolted onto the sound panels. Next, the fan exit guide vane support cone 51 is positioned and bolted to the engine core 18 and fan exit guide vane 48. Third, the flow splitter 52 is positioned and the radial bolts 53 are installed. Fourth, the fan blades 44 are slid into the corresponding retaining grooves 49 and the fan blade pin 50 is inserted. Finally, a nose cone assembly 182 is bolted onto the front end of the engine. The nose cone assembly 182 includes a primary piece 184 and a secondary piece 186. Completion of the assembly procedure results in an assembled condition for the powerplant 12, as shown in FIG. 1.

Figure 7:
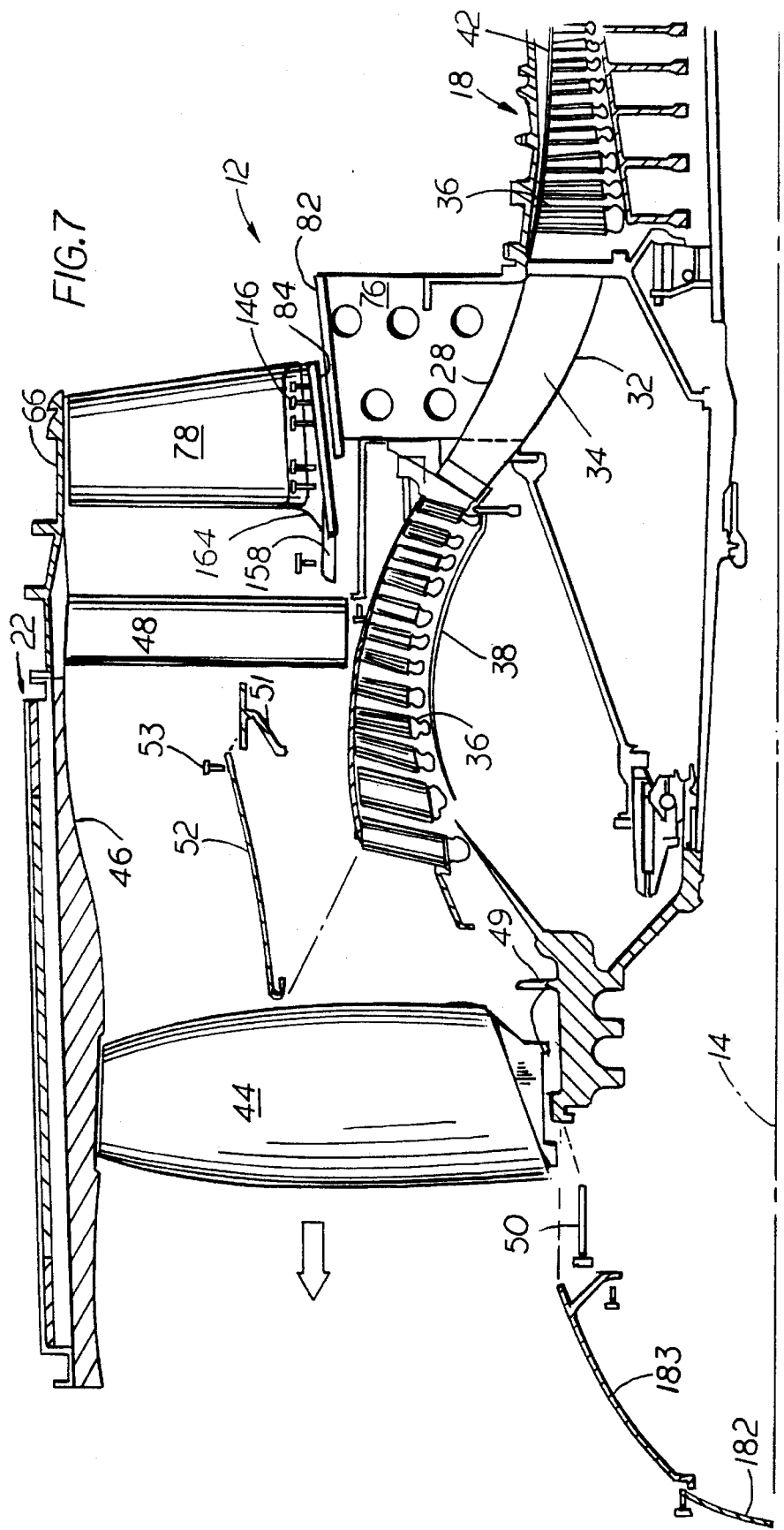
FIG. 7 is a sectional view similar to FIG. 1, but with the gas turbofan powerplant disassembled to show the separation into modules.

The method of disassembly of the gas turbofan powerplant is similar to the assembly procedure but in the reverse order. First, unbolt and remove the nose cone assembly 182. Second, the fan blade pin 50 is removed and the fan blades 44 are slid out of their retaining grooves 49. Third, the radial bolts 53 are removed from the flow splitter 52 and the flow splitter 52 is removed. Fourth, the fan exit guide vane support cone 51 is unbolted and removed. The fifth step is to unbolt the molded fillets 164 and remove them from each strut 64. The sixth step is to remove the joint bolts 146. Once the bolts 146 are removed, the spring force of the outer ring 66 should pull the mating fixtures 82, 84 apart and the radial gap between the mating surfaces 82, 84 should reappear. Once all the bolted joints 72 are unbolted, the fan cowling 46 can be removed from the engine core 18 by moving the fan cowling 46 and engine core 18 in opposite (divergent) directions along the longitudinal centerline 14 of the powerplant 12. In the event that a joint 72 does not separate easily, a jacking bolt 118 may be engaged with the threaded aperture 116 of the first mating fixture 82, as shown in FIG. 6. Upon sufficient engagement with the threaded aperture 116, the jacking bolt 118 will engage a downstream facing edge 114 of the second mating fixture 84 to force the second mating fixture 84 to separate from the first mating fixture 82. Completion of the disassembly procedure results in a disassembled condition for the powerplant 12, as shown in FIG. 7.

The assembly and disassembly procedures are facilitated by the presence of the joints 72 in the struts 64. The joints 72 separate the powerplant 12 into two modules. The first module 188 includes the engine core 18 and inner portion 76. The second module 192 includes the fan cowling 46, the guide vane 48, and the outer portion 78. Modularity makes the powerplant 12 more amenable to shipment. Instead of a single powerplant having large axial and radial dimensions, the invention produces a first module 188 having a smaller radial dimension and a second module 192 having a smaller axial dimension. It should be noted that the radial location of the joints 72 may, as shown in FIG. 7, determine the radial width of the first module and therefore the radial location of the joints 72 may be dependent on the allowable radial dimension of the first module 188.

Although the invention has been shown and described with respect to exemplary embodiments thereof, it should be understood by those skilled in the art that the various changes, omissions and additions may be made thereto, without departing from the spirit and scope of the invention.

We claim:

1. A method of varying a gas turbofan powerplant between an assembled condition and a disassembled condition, the gas turbofan powerplant including an engine core circumferentially disposed about a longitudinal centerline, a fan cowling circumferentially disposed outward of and concentric with the engine core, and a plurality of radially extending struts joining the fan cowling to the engine core, each of the struts having an inner portion and an outer portion, the inner portion and the outer portion coupled at a joint having an engaged position and a disengaged position, wherein a first module is comprised of the engine core and inner portion, and a second module is comprised of the fan cowling and the outer portion, the method comprising the steps of;

(a) manipulating the joints between the engaged position and the disengaged position;

(b) moving the first module relative to the second module unidirectionally, in an axial direction while simultaneously radially separating said inner portion of each of said struts from a corresponding outer portion thereof.

2. The method according to claim 1, wherein the inner portion includes a first mating fixture having a first mating surface, the outer portion includes a second mating fixture having a second mating surface, the first mating surface having a first radial distance defined by the radial separation between the centerline and the first mating surface, the second mating surface having a second radial distance defined by the radial separation between the centerline and the second mating surface, and wherein, in a disassembled condition, said second radial distance is greater than said first radial distance, and wherein the step of manipulating the joints into the engaged position includes preloading the strut with a tensile force.

3. The method according to claim 1, wherein the inner portion includes a first mating fixture having a planar mating surface which is canted relative to the centerline and wherein the outer portion includes a second mating fixture adapted to cooperate with the first mating fixture, and wherein the step of axially moving the modules includes axially divergent motion between the mating surfaces such that the first mating surface and second mating surface separate.

4. The method according to claim 1, wherein the inner portion has an alignment hole and the outer portion has a corresponding alignment hole formed to compliment the alignment hole of the inner portion, and wherein the alignment holes are adapted to engage with a prying bar in a manner permitting the prying bar to move the inner portion relative to the outer portion, the method further comprising the step of aligning the joints prior to manipulation into the engaged position by engaging the prying bar with the alignment holes.

5. The method according to claim 1, wherein the inner portion includes an outwardly radially extending lip having a threaded aperture extending longitudinally therethrough, the aperture adapted to engage with a jacking bolt such that the jacking bolt may pass through the threaded aperture and engage with the outer portion, and wherein the step of manipulating the joints between the engaged position and the disengaged position includes threading the jacking bolt through the threaded aperture a sufficient distance to disengage the inner portion from the outer portion.

\* \* \* \* \*